(12) United States Patent
Pugsley et al.

(10) Patent No.: US 8,310,084 B2
(45) Date of Patent: Nov. 13, 2012

(54) DEVICE AND METHOD FOR CONTROLLING A POWER SHUNT CIRCUIT, HYBRID VEHICLE HAVING SAME

(75) Inventors: Gareth Pugsley, Fontenay le Fleuri (FR); Serge Loudot, Villiers le Bacle (FR)

(73) Assignee: Renault S.A.S., Boulogne Billancourt (FR)

( * ) Notice: Subject to any disclaimer, the term of this patent is extended or adjusted under 35 U.S.C. 154(b) by 339 days.

(21) Appl. No.: 12/598,641

(22) PCT Filed: Apr. 28, 2008

(86) PCT No.: PCT/FR2008/050767
§ 371 (c)(1),
(2), (4) Date: Jan. 15, 2010

(87) PCT Pub. No.: WO2008/148977
PCT Pub. Date: Dec. 11, 2008

(65) Prior Publication Data
US 2010/0156172 A1  Jun. 24, 2010

(30) Foreign Application Priority Data
May 3, 2007  (FR) ...................... 07 03182

(51) Int. Cl.
*B60L 11/00* (2006.01)
(52) U.S. Cl. ....................... 307/10.1; 307/9.1

(58) Field of Classification Search .................. 307/9.1, 307/10.1
See application file for complete search history.

(56) References Cited

U.S. PATENT DOCUMENTS

| | | | |
|---|---|---|---|
| 5,414,339 A | 5/1995 | Masaki et al. | |
| 6,337,803 B2* | 1/2002 | Kikuchi et al. | 363/131 |
| 6,486,632 B2* | 11/2002 | Okushima et al. | 318/599 |
| 6,930,460 B2* | 8/2005 | Ishikawa et al. | 318/442 |
| 6,989,655 B2* | 1/2006 | Eguchi et al. | 322/23 |
| 7,023,171 B2* | 4/2006 | Su et al. | 318/400.26 |
| 2002/0027789 A1 | 3/2002 | Okushima et al. | |
| 2005/0162023 A1 | 7/2005 | Habu | |
| 2005/0225270 A1 | 10/2005 | Schnetzka et al. | |
| 2009/0101421 A1* | 4/2009 | Oyobe et al. | 180/65.29 |

FOREIGN PATENT DOCUMENTS
EP  1 186 464  3/2002
JP  2000 78850  3/2000

* cited by examiner

*Primary Examiner* — Adi Amrany
(74) *Attorney, Agent, or Firm* — Oblon, Spivak, McClelland, Maier & Neustadt, L.L.P.

(57) ABSTRACT

A device for controlling a power shunt circuit of a hybrid vehicle, including inverters, including DC sides linked to a DC voltage storage unit and AC sides intended to be linked to polyphase electrical machines. The polyphase electrical machines are able to operate in engine/engine or generator/generator modes. A control unit controls chopping switches of the second inverter in a way that is temporally offset relative to chopping switches of the first inverter in such a case, the control unit of the inverters controlling their chopping switches by pulse width vector modulation.

8 Claims, 3 Drawing Sheets

_DEVICE AND METHOD FOR CONTROLLING A POWER SHUNT CIRCUIT, HYBRID VEHICLE HAVING SAME_

BACKGROUND OF THE INVENTION

The invention relates to a device for controlling a power shunt circuit of a hybrid vehicle.

One field of application of the invention is hybrid road vehicles.

Document U.S. Pat. No. 6,486,632 describes a device comprising first and second inverters the DC sides of which are connected to a DC-voltage storage unit, the AC sides of which are designed to be connected to first and second polyphase electric machines, designed to be coupled to the mechanical drive of the vehicle, the first machine being capable of operating as a motor and the second machine being capable of operating as a generator for the shunting of power from the drive, the inverters also comprising chopping switches for the conversion between the DC sides and the AC sides, the device comprising a capacitor for filtering harmonics on the DC sides of the inverters and a unit for controlling the chopping switches, comprising a mode for controlling the chopping switches by pulse-width modulation of a carrier having an identical frequency for the inverters.

As is known in hybrid vehicles with power shunt and is represented in FIG. 1, two electric machines 3, 4 are connected to a mechanical drive 5 connected to the wheels 6, 7 on one side and to a power storage system 8 on the other side. Two inverters 1, 2 are used to control the machines 3, 4. For the shunting of power from the drive 5 when the drive 5 is driven by the internal combustion engine 9 of the vehicle, one of the machines must operate as a motor, while the other must operate as a generator. When the internal combustion engine is switched off, one of the two machines 3, 4 is used to operate the drive.

A common filtering capacitor C is usually mounted on the DC bus 10 between the two inverters 1, 2.

The inverters 1, 2 chop by opening and closing their DC-voltage switches in order to generate AC voltages which supply the machines 3, 4. This is called PWM (pulse-width modulation) chopping.

The high-frequency (a few kHz) chopping generates harmonics in addition to the effective fundamental on the currents of the machines, and in the same manner broadens the spectrum of the current generated on the DC bus 10.

The capacitor C filters most of these current harmonics in order to return a current as direct as possible to the storage element. The aging of the capacitor is sensitive to its heating, therefore to the RMS current passing through it. It is therefore of value to control the current to be filtered and its harmonic content.

Moreover, there are several possible chopping strategies for the inverters.

SUMMARY OF THE INVENTION

A first objective of the invention is to optimize the pulse-width modulation control of the inverters.

A second objective of the invention is to minimize the current waves of the capacitor and the RMS current passing through it.

A third objective of the invention is to optimize the voltage of the phases of the machines.

A first subject of the invention is a device for controlling a power shunt circuit of a hybrid vehicle, the device comprising first and second inverters the DC sides of which are connected to a DC-voltage storage unit, the AC sides of which are designed to be connected to first and second polyphase electric machines, designed to be coupled to the mechanical drive of the vehicle, the first machine being capable of operating as a generator and the second machine being capable of operating as a motor for the shunting of power from the drive, the inverters also comprising chopping switches for the conversion between the DC sides and the AC sides, the device comprising a capacitor for filtering harmonics on the DC sides of the inverters and a unit for controlling the chopping switches, comprising at least one mode for controlling the chopping switches by pulse-width modulation of a carrier having an identical frequency for the inverters, characterized in that the first and second machines are capable of operating as motor/motor or as generator/generator, the control unit comprises means for detecting the operation of the first and second machines as motor/motor or as generator/generator and first means for controlling the chopping switches of the second inverter in a time-shifted manner relative to the chopping switches of the first inverter in the event of detection of the operation of the first and second machines as motor/motor or as generator/generator, and also the unit for controlling the inverters comprises a means for controlling their chopping switches according to a pulse-width vectorial modulation mode.

According to other features of the invention:

Said time shift between the second inverter and the first inverter comprises a half-period of the carrier.

The unit for controlling the inverters comprises a first mode for controlling their chopping switches by pulse-width scalar modulation, a second mode for controlling their chopping switches by pulse-width vectorial modulation, a third mode for controlling their chopping switches by overmodulated pulse-width modulation and a fourth, full wave, mode for controlling their chopping switches.

The control unit comprises a mode-selection means for applying to the inverters the first, second, third or fourth mode for associated speed and torque values of machines situated respectively in first, second, third and fourth adjacent fields of increasing values.

The control unit comprises, in addition to the first control means, means for detecting the operation of the first and second machines as motor/generator or as generator/motor and means for controlling the chopping switches of the second inverter with the same time phase as the chopping switches of the first inverter in the event of detection of the operation of the first and second machine as motor/generator or as generator/motor.

A DC-DC converter is inserted between the capacitor and the power storage unit.

A second subject of the invention is a method for controlling a power shunt circuit onboard a hybrid vehicle, for applying the control device as described above, using first and second inverters the DC sides of which are connected to a DC-voltage storage unit, the AC sides of which are connected to first and second polyphase electric machines, coupled to the mechanical drive of the vehicle, the first machine operating as a generator and the second machine operating as a motor for the shunting of power from the drive, the inverters also comprising chopping switches for the conversion between the DC sides and the AC sides, a capacitor for filtering harmonics being provided on the DC sides of the inverters, the chopping switches being controlled by a control unit having at least one mode for controlling the chopping switches by pulse-width modulation of a carrier having an identical frequency for the inverters, characterized in that the first and second machines are made to operate as motor/motor or as generator/generator, the chopping switches of the second inverter are controlled in a time-shifted manner relative to the chopping switches of the first inverter in the event of operation of the first and second machines as motor/motor or as generator/generator.

According to other features of the invention:

The time shift between the second inverter and the first inverter in the event of operation of the first and second machines as motor/motor or as generator/generator corresponds to a half-period of the carrier.

The chopping switches of the inverters are controlled according to a first pulse-width scalar modulation control mode, according to a second pulse-width vectorial modulation control mode, according to a third overmodulated pulse-width modulation control mode, and according to a fourth, full wave, control mode for associated speed and torque values of the machines situated respectively in first, second, third and fourth adjacent fields of increasing values.

A third subject of the invention is a hybrid vehicle comprising an internal combustion engine for driving wheels via a mechanical drive, the mechanical drive being coupled to first and second electric machines, the first machine being capable of operating as a generator and the second machine being capable of operating as a motor in order to form a power shunt circuit from the drive, characterized in that the first and second electric machines are connected to an onboard control device as described above.

BRIEF DESCRIPTION OF THE DRAWINGS

The invention will be better understood on reading the following description given only as a nonlimiting example with reference to the appended drawings, in which.

DETAILED DESCRIPTION OF THE INVENTION

Figure 1:
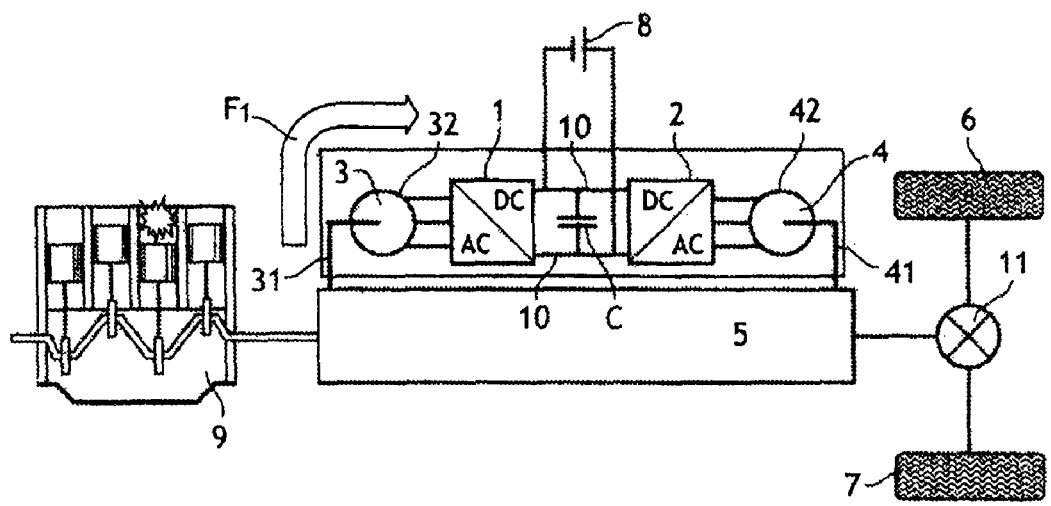
FIG. 1 is a diagram of the drive of a hybrid vehicle.
Figure 2:
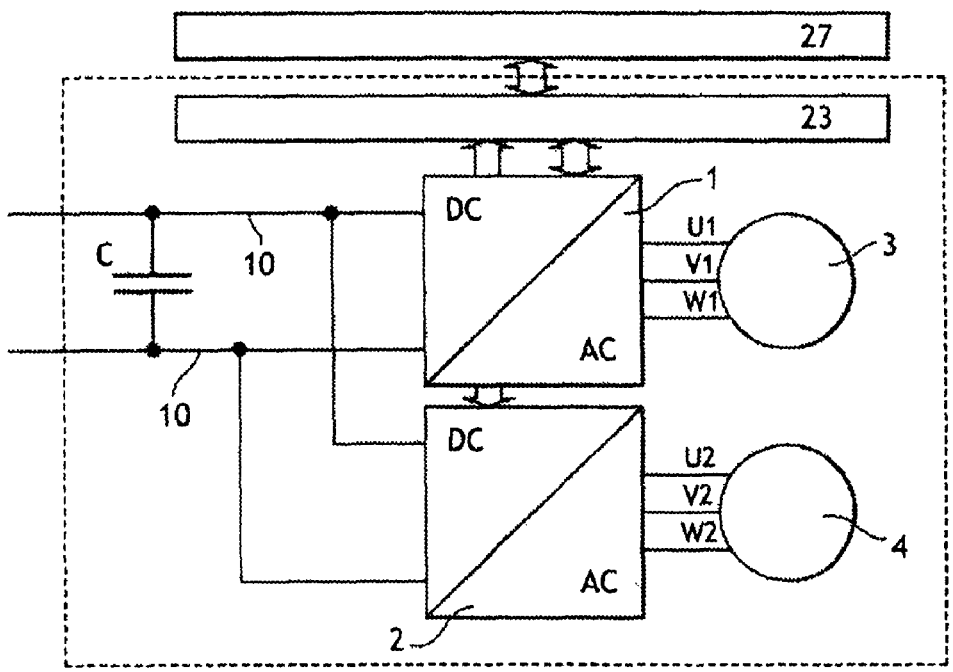
FIG. 2 is a diagram of the electrotechnical portion connected to the mechanical drive according to FIG. 1.

In the figures, the electric machines 3, 4 are for example three-phase machines and each comprise three distinct phases U1, V1, W1, and U2, V2, W2, connected respectively to the AC side of the inverters 1 and 2. The machines 3, 4 comprise respectively a movable portion 31, 41 which is mechanically connected to the drive 5 and which can be moved relative to the mechanical portion 32, 42 connected to the phases U1, V1, W1, U2, V2, W2.

When the internal combustion engine 9 runs in order to mechanically operate the drive 5 in order to rotate the wheels 6, 7 via a differential 11, the machine 3 operates as a generator and shunts the electric power from the drive 5 to the AC side of the inverter 1 as shown by the arrow F1, this shunted electric power being converted into DC current on the DC side of the inverter 1 in order to store energy in the storage element 8. The other machine 4 then operates as a motor for this power shunt. The power storage element 8 is, for example, formed by one or more rechargeable electric batteries, or one or more supercapacitors, as is known. The internal combustion engine may also drive the wheels with the machine 3 as motor, and the machine 4 as generator. The choice of motor/generator or generator/motor modes is made by the supervisor.

The inverters 1, 2 comprise respectively switches I1, I2 for chopping the DC current on their DC side into AC current on the phases U1, V1, W1 and U2, V2, W2. For example, in FIG. 3, each inverter 1, 2 comprises, for each phase, two switches I1 or I2 in series between the two conductors 10 of the DC bus, the node between the two switches I1 or I2 being connected to the phase U1, V1 or W1, U2, V2 or W2. Each switch I1, I2 is, for example, formed by an IGBT (insulated-gate bipolar transistor) in parallel with which an inverse diode is provided. Each switch I1, I2 comprises an input E1, E2 for controlling its opening or its closure, this input being formed for the IGBT transistors by their gate. The inputs E1 for controlling the switches I1 of the inverter 1 are connected to a first control circuit 21, while the inputs E2 for controlling the switches 12 of the inverter 2 are connected to a second control circuit 22. The first and second control circuits 21, 22 are connected to a low-level control unit 23, comprising a first module 24 for generating a carrier, which is sent to the first circuit 21, and a second circuit 25 for generating a carrier, which is sent to the second circuit 22. The unit 23 comprises one or more computers 26, notably for controlling the modules 24 and 25. In addition, the low-level control unit 23 is connected to a high-level control unit 27 of the vehicle.

The desire of the driver and/or the control strategy of the vehicle determine the torques and/or the speeds applied to the electric machines 3, 4.

Irrespective of this "high layer" command originating from a supervisor 27, it is possible to control the "low layer" signals of the inverters; notably the strategy of voltage-chopping of the machines 3, 4. The "low layer" control is incorporated into the computer(s) 26. This/these computer(s) 26 control(s) the control circuits 21, 22 which transmit the ON/OFF switching instructions to the switch I1, I2.

There are several operations of the electric machines, chosen by the "high level" control of the vehicle. The two machines can operate as:

motor/motor,
generator/motor,
motor/generator,
generator/generator.

The phase voltage of the machines is chopped according to the first, second, third and fourth control modes imposed by the computer 26 of the unit 23 to the circuits 21, 22, respectively as:

scalar PWM, indicated in the figures by PWM1,
vectorial PWM, indicated in the figures by PWM2,
overmodulated PWM, indicated in the figures by PWM3,
full wave, indicated in the figures by PO.

The chopping strategy is selected to solve the problem consisting in reducing the design of the filtering capacitor C, but without overcomplicating the low layer control and without impacting on the performance of the vehicle.

Another object is to reduce the current harmonics the RMS current of which is at the origin of the heating and aging of the filtering capacitor C. A "clean" sine-wave voltage is also desired at the terminals of the machines.

Consequently, the need to automatically overengineer the capacitor C to solve these problems is dispensed with.

The aim is to reduce as much as possible the current filtered by the capacitor, depending on the operating situations of the vehicle and of the electric machines.

At the same time, an attempt is made to apply the cleanest voltage (that is to say the first harmonics of which, excluding the fundamental, are at the chopping frequency; there are no odd harmonics 3, 5, 7, and so on, the first ranks originate from the chopping) to the machines according to the torque and speed setpoints.

The choice of the type of control depends in the first place on the speed and torque requested of the machines and is selected by the computer 26.

The Case of Supplying the Machines with Low Voltage Amplitudes (Usually Low Speed and Low Torque Uses)

Figure 5:
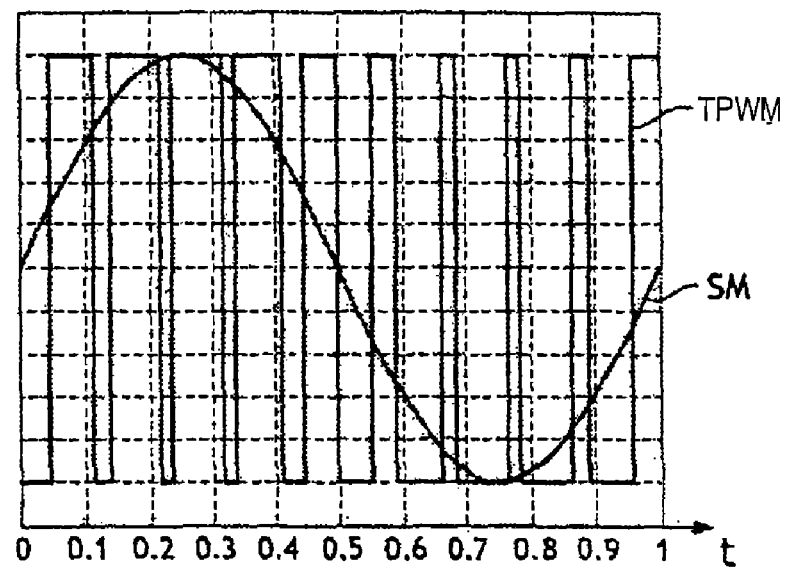
FIG. 5 represents an example of the current signal obtained by scalar modulation of a sine as a function of the time on the abscissa.

Preference is given to the scalar PWM control when a machine is supplied with a low amplitude voltage. In the prior art, a simple method for generating such an MLI signal is to make a comparison between a triangular carrier (at the chopping frequency PWM) and the setpoint (modulating) signal. In fact, the pulse width increasingly originates from the result of a digital computer to the detriment of an analog comparison. FIG. 5 shows the result of a sine-wave signal SM modulated by scalar PWM (TPWM).

The use of this control makes it possible to apply low (or even zero) voltages to the machines. It is therefore perfectly suited to the low speed zones.

A Situation of General Use

In the majority of usage situations, preference is given to a vectorial PWM control.

The vectorial PWM control is not the application of three voltages independent of one another like the scalar PWM but as a strategy for controlling the rotating vector of a three-phase (or polyphase) system, therefore with a synchronization of the pulses between phases. One of the main advantages of this strategy is to be able to supply a fundamental voltage higher than that which three juxtaposed independent scalar strategies could deliver.

When the maximum amplitude of sine-wave voltage that can be generated in vectorial PWM is reached, it is then called overmodulated PWM. In this case, multiple harmonics of the fundamental frequency are added in the signal in order to increase the amplitude of the latter.

The Situation of Using a Very High Voltage (Usually With Very High Power and High Speed)

Preference is given to the full wave control when the amplitude of the voltages cannot be achieved by the other control modes. The supply voltage is applied alternatively to each pole of the load at the fundamental frequency that it is desired to obtain. This gives a maximum amplitude of AC voltage at the terminals of the machines. This makes it possible to reach the zones of high power (torque) at the price of a current overload (additional losses) due to the low-frequency harmonics of the voltage.

Figure 4:
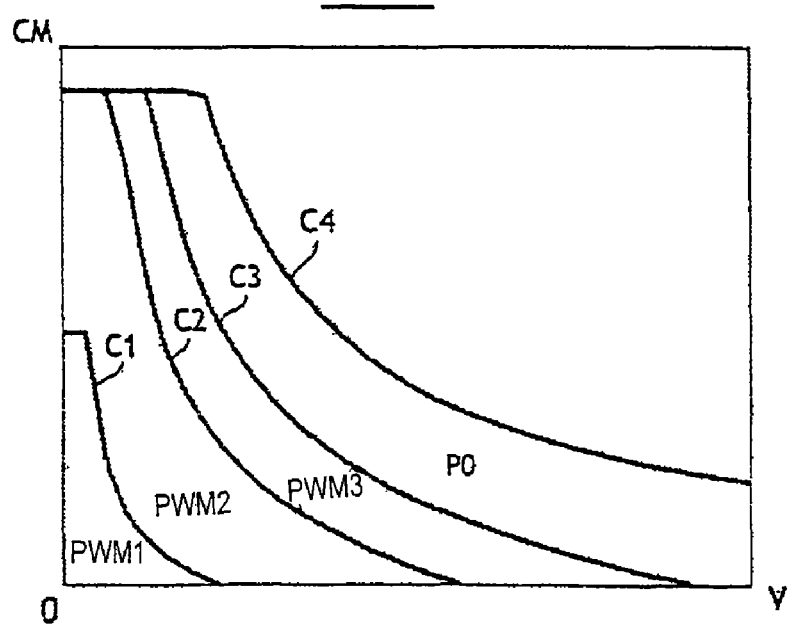
FIG. 4 is a diagram representing on the abscissa the rotation speed of the electric machine and on the ordinate the torque of the electric machine and curves delimiting the choices of voltage chopping by the inverters depending on the zones of operation of the machine.

The transitions between the modes are determined as a function of the electric losses and their distribution between the machine losses and inverter losses. FIG. 4 illustrates various operating situations.

In FIG. 4, the scalar control mode PWM1 is delimited from the point O of zero speed V and zero torque CM by a first curve C1 of torque as a function of the speed. The second vectorial control mode PWM2 is delimited by the curve C1 and a second curve C2 for increasing values of speed V and/or of torque CM relative to the curve C1. The third vectorial overmodulated control mode PWM3 is delimited by the curve C2 and a third curve C3 for increasing values of speed V and/or of torque CM relative to the curve C2. The fourth, full wave control mode PO is delimited by the curve C3 and a fourth curve C4 for increasing values of speed V and/or of torque CM relative to the curve C3. The curves C1, C2, C3 and C4 are decreasing, for example like hyperbola. The fourth curve C4 is an envelope curve of torque of the machine in motor mode.

The choice of the type of control also depends on the situations of use of the two machines 3, 4.

The Motor/Motor or Generator/Generator Situation

These modes are used in ZEV (exclusively electric running, corresponding to the internal combustion engine 9 stopped).

Figure 3:
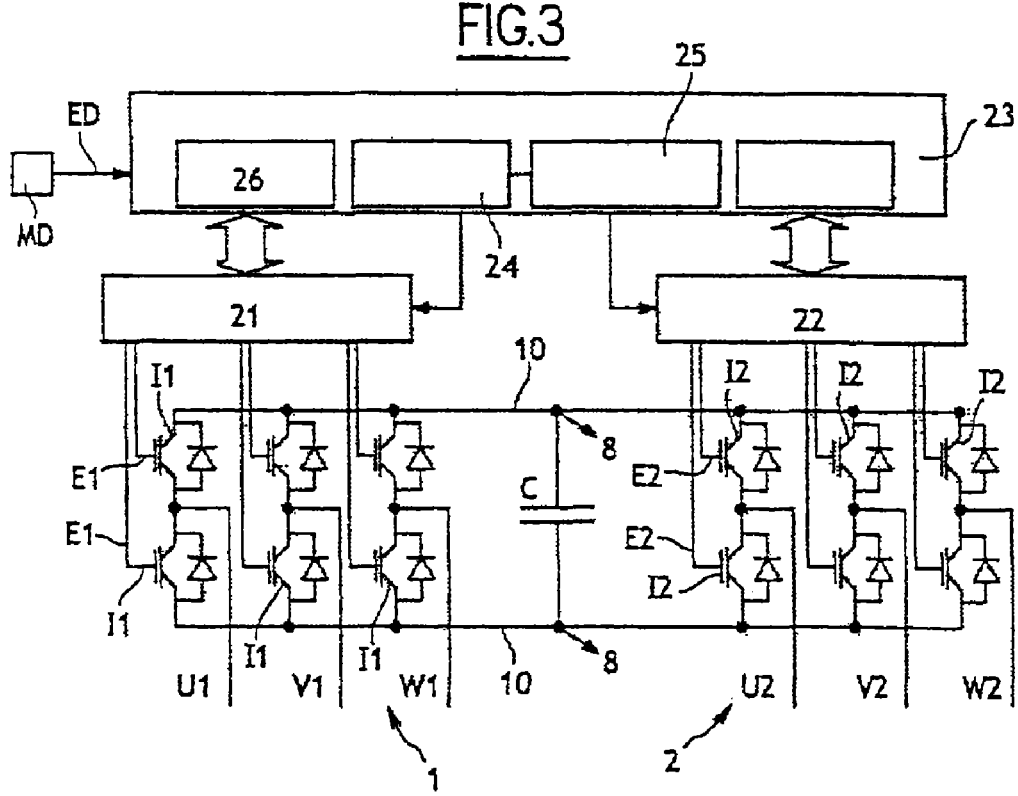
FIG. 3 is a detailed diagram of the two inverters of the electrotechnical portion of FIG. 2.

If the two machines are controlled in PWM, the chopping of one machine will be out of phase relative to the other. This offset is, for example, by a carrier half-period. The two carriers have the same frequency. In the embodiment of FIG. 3, the carrier-generation module 25 sends to the control circuit 22 of the inverter 2 a carrier offset by a half-period, that is to say in phase opposition, relative to the carrier of the same frequency sent by the generation module 24 to the control circuit 21 of the inverter 1. Therefore, the carriers sent to the inverters 1 and 2 have the same frequency and are offset by a half-period from one another.

The fact that the machines 3, 4 each operate as motor or each as generator is detected by any appropriate detection means MD, this state ED for detecting operation as motor-motor or generator-generator of the machines 3, 4 being sent to the control unit 23 in order to offset the carriers of the modules 24 and 25.

In an example in which the two machines 3, 4 in motor mode have been controlled in vectorial pulse-width modulation, when the sum of the currents to be filtered of the two inverters has been 76.5 effective amperes (that is to say RMS) for carriers that are not offset, this sum of the currents to be filtered of the two inverters was 46.8 amperes RMS with the vectorial pulse-width modulation control for the carriers offset by a half-period, that is a 39% reduction of the RMS current to be filtered by the capacitor C.

In one embodiment, preference has been given to the balance of the phase currents of the two machines. That is to say that the "high level" control chooses the corresponding torque for one and the same current on each machine, the sum of the torques being transmitted to the wheel. Typically, this is possible in ZEV running mode.

The Motor/Generator or Generator/Motor Situation

This is a usual operating mode of the hybrid vehicle. The torques applied to the motor are controlled by the "high level" control.

Since the currents are naturally in opposite directions, the current to be filtered on the DC bus 10 is naturally reduced.

If the two machines are PWM controlled, it is preferable for the carriers of the two inverters to have the same phase and the same frequency.

Figure 6:
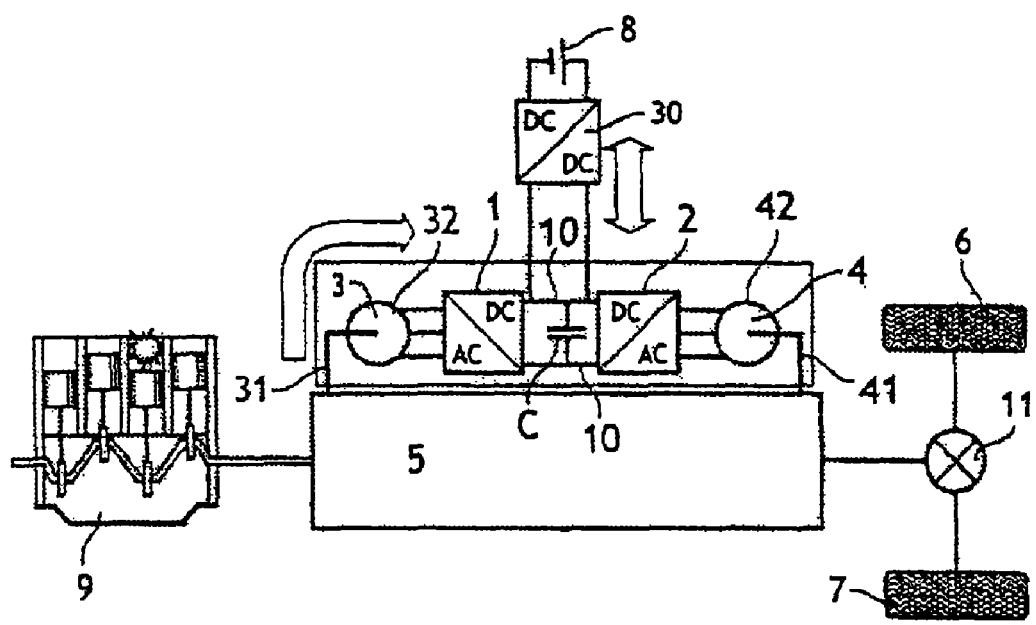
FIG. 6 is a diagram of the drive according to FIG. 1 with DC-DC converter.

In the embodiment of FIG. 6, the structure may comprise a DC/DC converter 30 between the capacitor C and the storage element 8 so as to have a DC bus 10 voltage that is optimal for the inverters 1, 2 and machines 3, 4 on the one hand, and to make this voltage insensitive to the voltage variations of the storage element 8 on the other hand.

In this case, the frequency of the chopping harmonics originating from the DC/DC converter 30 must have a frequency higher than those of the inverters, which most of the time is the case.

Although little used, a variant with motors with more than three phases can be envisaged. The main consequence is that the low-frequency harmonics of the current to be filtered will be of a rank higher than 6 times the fundamental frequency of the phase current (twice the number of phases).

The main consequence is that the difference is reduced between the chopping harmonics and the harmonics due to the fundamentals of the phase current. This can lead to increasing the chopping frequency relative to a three-phase system if this difference is insufficient.

Therefore, at the input of the inverters 1, 2 (DC side), the current waves of the capacitor C are minimized. At the output (AC side) of the inverters 1, 2, the setpoint and fundamental error of the voltages at the terminals of the machines 3, 4 is minimized in order therefore to have clean sine-wave voltages. Naturally, it is possible either only to minimize the current waves or only to have a clean output voltage.

The invention claimed is:

1. A control device for controlling a power shunt circuit of a hybrid vehicle, the control device comprising:
    first and second inverters comprising DC sides connected to a DC-voltage storage unit, and AC sides configured to be connected to first and second polyphase electric machines, and to be coupled to a mechanical drive of the vehicle, the first polyphase electric machine being capable of operating as a generator or a motor and the second polyphase electric machine being capable of operating as a motor for shunting of power from the drive or a generator, the inverters further comprising chopping switches for conversion between the DC sides and the AC sides;
    a capacitor that filters harmonics on the DC sides of the inverters; and
    a control unit that controls the chopping switches, comprising at least one mode for controlling the chopping switches by pulse-width modulation of a carrier having an identical frequency for the inverters,
    wherein the first and second machines are capable of operating as a motor/motor or as a generator/generator,
    wherein the control unit comprises means for detecting the operation of the first and second machines as the motor/motor or as the generator/generator and first means for controlling the chopping switches of the second inverter in a time-shifted manner relative to the chopping switches of the first inverter in an event of detection of the operation of the first and second machines as the motor/motor or as the generator/generator, and
    wherein the control unit further comprises means for controlling the chopping switches according to a first mode for controlling the chopping switches by pulse-width scalar modulation, a second mode for controlling the chopping switches by pulse-width vectorial modulation, a third mode for controlling the chopping switches by overmodulated pulse-width modulation, and a fourth, full wave, mode for controlling the chopping switches.

2. The control device as claimed in claim 1, wherein the time shift between the second inverter and the first inverter comprises a half-period of the carrier.

3. The control device as claimed in claim 1, wherein the control unit further comprises a mode-selection means for applying to the inverters the first, second, third, or fourth modes for associated speed and torque values of machines situated respectively in first, second, third, and fourth adjacent fields of increasing values.

4. The control device as claim 1, wherein the control unit further comprises means for detecting the operation of the first and second machines as motor/generator or as generator/motor and means for controlling the chopping switches of the second inverter with the same time phase as the chopping switches of the first inverter in the event of detection of the operation of the first and second machine as the motor/generator or as the generator/motor.

5. The control device as claimed in claim 1, further comprising a DC-DC converter inserted between the capacitor and the power storage unit.

6. A hybrid vehicle, comprising:
    the control device as claimed in claim 1;
    an internal combustion engine for driving wheels via a mechanical drive, the mechanical drive being coupled to the first and second electric machines, the first electric machine configured to operate as a generator and the second electric machine configured to operate as a motor to form a power shunt circuit from the drive.

7. A method for controlling a power shunt circuit onboard a hybrid vehicle, with a control device including first and second inverters including DC sides connected to a DC-voltage storage unit, and AC sides configured to be connected to first and second polyphase electric machines, and to be coupled to a mechanical drive of the hybrid vehicle, the first polyphase electric machine being capable of operating as a generator or a motor and the second polyphase electric machine being capable of operating as a motor for shunting of power from the mechanical drive or a generator, the inverters further including chopping switches for conversion between the DC sides and the AC sides, the method comprising:
    filtering, with a capacitor, harmonics on the DC sides of the inverters;
    controlling, with a control unit, the chopping switches, including at least one mode for controlling the chopping switches by pulse-width modulation of a carrier having an identical frequency for the inverters, wherein the first and second machines are capable of operating as a motor/motor or as a generator/generator;
    detecting, with the control unit, the operation of the first and second machines as the motor/motor or as the generator/generator;
    controlling the chopping switches of the second inverter in a time-shifted manner relative to the chopping switches of the first inverter in an event of detection of the operation of the first and second machines as the motor/motor or as the generator/generator; and
    controlling, with the control unit, the chopping switches according to a first mode for controlling the chopping switches by pulse-width scalar modulation, a second mode for controlling the chopping switches by pulse-width vectorial modulation, a third mode for controlling the chopping switches by overmodulated pulse-width modulation, and a fourth, full wave, mode for controlling the chopping switches.

8. The control method as claimed in claim 7, wherein a time shift between the second inverter and the first inverter in the event of operation of the first and second machines as the motor/motor or as the generator/generator corresponds to a half-period of the carrier.

* * * * *